Feb. 3, 1970  F. J. FINK  3,493,099
CHIP SWEEPER FOR MACHINE SYSTEMS HAVING INDEXING TURRETS
Filed Jan. 29, 1968  2 Sheets-Sheet 1
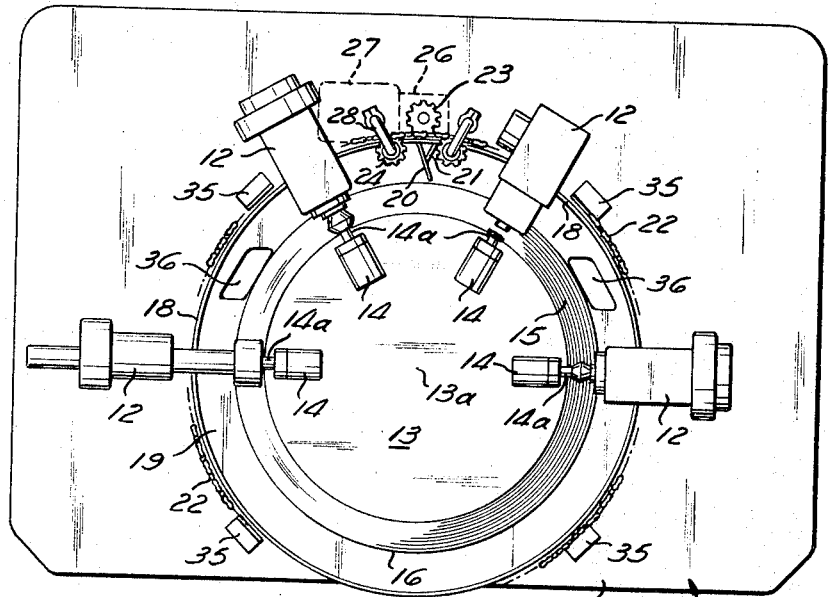
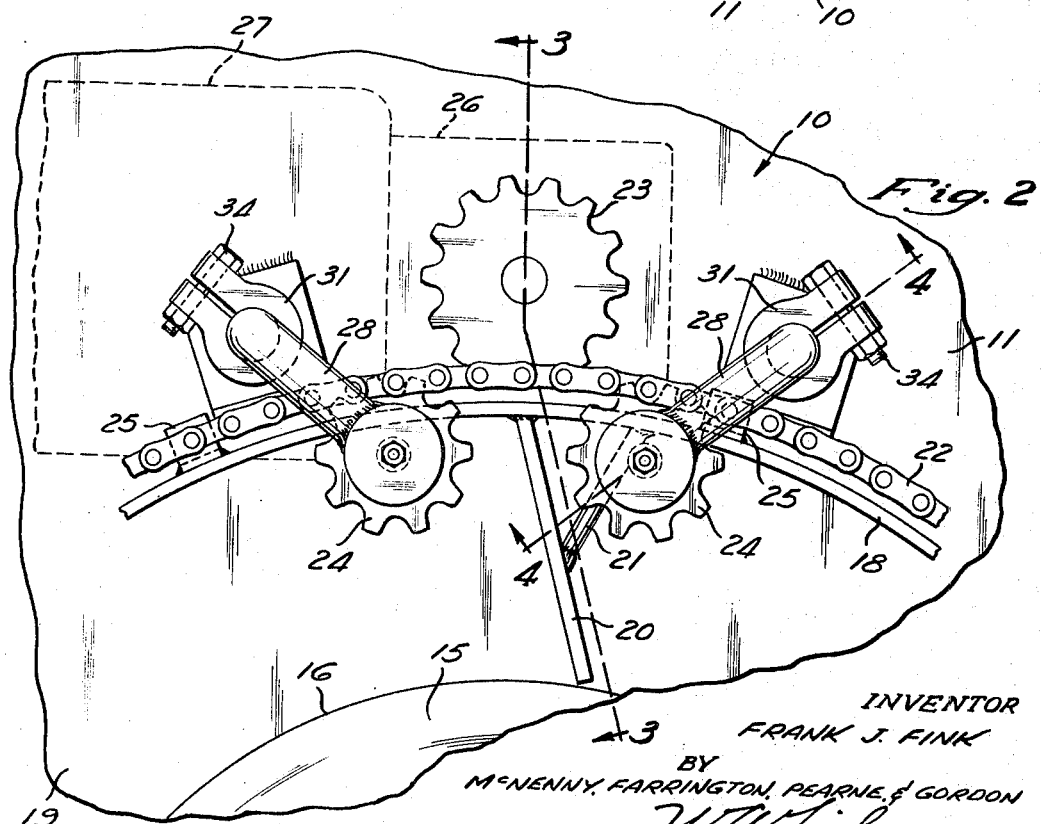
INVENTOR
FRANK J. FINK
BY
McNENNY, FARRINGTON, PEARNE, & GORDON
ATTORNEYS Feb. 3, 1970                F. J. FINK                3,493,099
CHIP SWEEPER FOR MACHINE SYSTEMS HAVING INDEXING TURRETS
Filed Jan. 29, 1968                              2 Sheets-Sheet 2
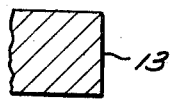
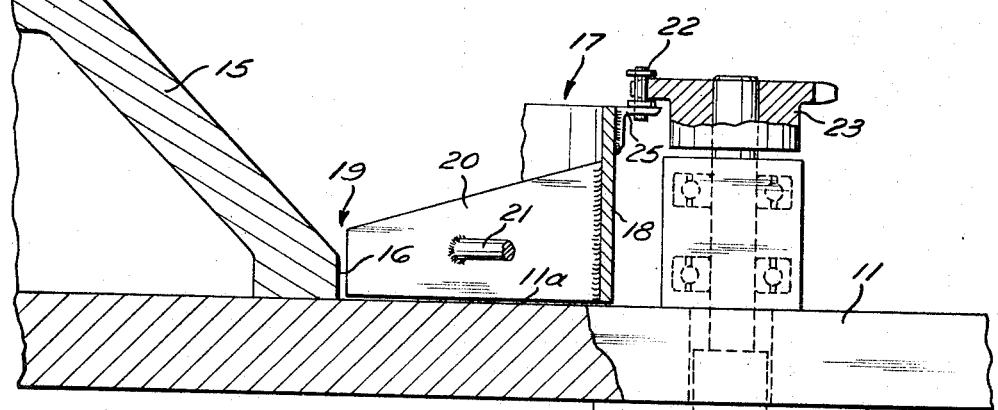
Fig. 3
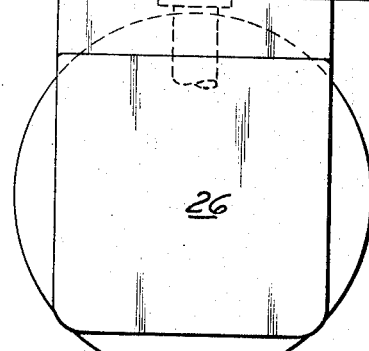
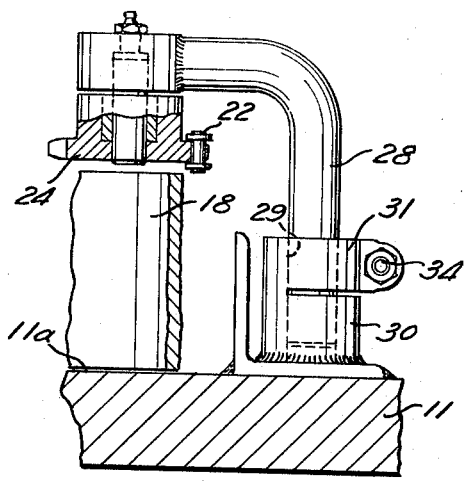
Fig. 4
INVENTOR
FRANK J. FINK
BY
M°NENNY, FARRINGTON, PEARNE & GORDON
ATTORNEYS

United States Patent Office 3,493,099
Patented Feb. 3, 1970

3,493,099
CHIP SWEEPER FOR MACHINE SYSTEMS HAVING INDEXING TURRETS
Frank J. Fink, Chardon, Ohio, assignor to Imperial Manufacturing & Engineering Co., Middlefield, Ohio, a corporation of Michigan
Filed Jan. 29, 1968, Ser. No. 701,322
Int. Cl. B65g 29/00
U.S. Cl. 198—212               6 Claims

ABSTRACT OF THE DISCLOSURE

A chip sweeper assembly for a machine system including an indexing table which includes a trough or basin around the table positioned to receive chips and turnings. The basin is defined in part by a conveyor ring having a plurality of sweeping paddles which sweep chips or other byproducts of the machining operation along the trough to discharge apertures provided in the lower wall thereof. The conveyor ring is peripherally driven by a sprocket drive which engages a drive chain secured to the ring. Idler rollers retain the chain in engagement with the drive sprocket and provide some guiding for the ring.

BACKGROUND OF THE INVENTION

Sequentially operating turret type machines, utilizing indexing tables or the like, produce chips and turnings which tend to accumulate beneath the cutting head or heads adjacent to the work holding turret. It is, therefore, necessary for machine operators to sweep away such turnings or chips from time to time so that they will not foul the mechanism or otherwise interfere with the machining operations. Many operators often allow an excessive build-up of chips and turnings since manual sweeping operations are bothersome and time consuming. Therefore, damage to the machine and workpieces may occur from the accumulated material. Further the manual removal of the waste may distract the machine operator when his attention should be directed to the machining operation.

SUMMARY OF INVENTION

According to this invention an inexpensive and simple chip sweeper is provided which may be installed in a variety of turret type machine systems having indexing devices which rotate about a generally vertical axis. The simplicity of the device provided in accordance with this invention reduces both the initial expense of the chip sweeper and the operating maintenance thereof. The chip sweeper according to this invention, moreover, may be installed on many existing machines and replaced without disturbing other components of the machine assembly.

In the illustrated embodiment of this invention the machine is provided with an annular trough or basin which extends around the turret and is positioned to receive turnings or chips produced by the machining operations. A portion of the trough is defined by a sweeper ring which is peripherally driven and rotates around the axis of the turret. The ring is provided with paddles which are carried along the trough to sweep the chips, turnings, and the like along the trough to apertures through which the chips and turnings fall for removal from the machine.

The peripheral drive includes a link chain secured to the conveyor ring and extending therearound which cooperates with a drive sprocket and idler sprockets to form a positive mechanical drive for the conveyor ring. The elements necessary to form this drive are commercially available at low cost, and are easily assembled. Therefore, an inexpensive, reliable, and positive peripheral drive is provided.

OBJECTS OF INVENTION

It is an important object of this invention to provide a novel and improved turret type machine system incorporating simplified conveyor means for sweeping chips, turnings, and the like from the machine.

It is another important object of this invention to provide a novel and improved conveyor or sweeping structure for use in machine systems to automatically remove chips, turnings, or the like from the machine system.

Further objects and advantages will appear from the following description and drawings wherein:

FIGURE 1 is a plan view of a sequentially operated work holding turret and its associated power tools illustrating a chip sweeping arrangement in accordance with this invention associated therewith;

FIGURE 2 is an enlarged fragmentary plan view of the drive mechanism for the chip sweeper illustrated in FIGURE 1;

FIGURE 3 is a cross sectional view, the plane of the section being indicated by the line 3—3 of FIGURE 2; and FIGURE 4 is a cross sectional view, the plane of the section being indicated by the line 4—4 of FIGURE 2.

DETAILED DESCRIPTION OF THE DRAWINGS

A typical turret type machine 10 is illustrated in FIGURE 1. This machine includes a base 11 upon which a plurality of power heads 12 are mounted. A work holding indexing turret or table 13 is journaled on the base 11 for step-by-step indexing rotation about a vertical axis 13a. The turret 13 carries a plurality of workpiece holders 14 which are sequentially advanced to each power head 12 so that each power head may sequentially perform a different machining operation on each workpiece 14a carried by the work holders 14.

Extending around the turret 13 is an annular trough or basin 19 which is shaped and located so that it catches chips and turnings which result from the machining operations performed by the power heads 12.

Referring to FIGURE 3, the trough 19 is defined by a sloping portion 15 of the base 11 which extends downwardly and radially outward from a position under the periphery of the table 13 to a vertical wall 16. The vertical wall 16 extends between the sloping portion 15 and a horizontally extending bottom wall 11a. A chip sweeper assembly 17 includes a conveyor ring 18 which provides a vertical wall extending around the turret 13 and cooperating with the walls 11a, 15, and 16 to define the annular trough or basin 19 in which the chips and turnings are collected.

A plurality of sweeping paddles 20 are fixed at one end to the inside surface of the conveyor ring 18 and extending inwardly toward the wall 16. Each paddle 20 is angularly related to diameters of the ring 18 and is braced by a rod 21 which extends between the associated paddle and the ring. The lower edge of the ring 18 and the lower edge of each of the paddles 20 slide along the horizontal surface 11a and when the ring is rotated, the paddles 20 carry chips or turnings along the trough 19 until they reach chip receiving apertures 36 (illustrated in FIGURE 1) through which the chips drop out of the trough. Located under the apertures may be any suitable collecting means or conveyor means to remove the chips and turnings from the machine.

A simple and inexpensive positive mechanical drive is provided to rotate the ring assembly 17. This drive includes a roller type link chain 22 which is mounted on the ring 18 adjacent to its upper edge and extends completely around the ring. The chain 22 is secured to the ring 18 by a plurality of mounting brackets 25 which are tack welded to the ring 18 and are close enough together to support the chain in a substantially circular shape.

A drive sprocket 23 is driven in a clockwise direction, as viewed in FIGURES 1 and 2, through a reduction gear box 26, by a motor 27 provided beneath the base 11. The chain 22 is held in meshing engagement with the drive sprocket 23 by a pair of idler sprockets 24 which are positioned to engage the side of the chain opposite the sprocket 23 with one sprocket 24 engaging the chain ahead of the sprocket 23 and one engaging the chain behind the sprocket 23. With this peripheral drive structure a positive mechanical drive is provided which utilizes low-cost commercially available items and, therefore, is low in initial cost and reliable in operation.

The support for the idler sprocket 24 is best illustrated in FIGURE 4. This support includes a sleeve 30 welded to the base 11 and formed with a central opening 29 proportioned to receive the end of an arm 28. A slotted clamp portion 31 provided with a clamping bolt 34 locks the arm 28 in any desired adjusted position. The arm 28 is provided with a horizontally extending portion which extends over the chain 22 and ring 18 to provide a journal for the sprocket 24.

The lateral positioning of the ring conveyor 17 may be provided by engagement with the inner ends of the paddles 20 and the wall 16. It should be understood that the conveyor assembly is preferably provided with a plurality of paddles 20 symmetrically positioned around the ring. In one embodiment eight paddles 20 are provided at 45° intervals around the ring 18. On the other hand, if desired, a plurality of peripherally spaced guides 35 may also be positioned around the ring 18 to laterally locate the ring as it is rotated by the peripheral drive. Because the peripheral chain 22 is positioned against the drive sprocket 23 by the two idler rollers 24, precise positioning of the ring is not required for proper operation and the drive can accommodate a substantial amount of lateral movement of the ring.

The apertures 36 are preferably located adjacent to the wall 16 and the paddles 20 are preferably angulated so that the chips and turnings are urged toward the wall 16 away from the ring 18 as the ring rotates. This structure tends to keep the chips and turnings away from the ring 18 and, therefore, minimizes any tendency of their collection under the edges of the ring.

Although a preferred embodiment of this invention is illustrated, it is to be understood that various modifications and rearrangements of parts may be resorted to without departing from the scope of the invention disclosed and claimed herein.

What is claimed is:

1. A chip sweeper for a machining system having a turret mounted for rotation about a vertical axis comprising a bed, inner wall means, outer wall means movably mounted on said bed and surrounding said inner wall means and said turret to define, with inner wall means and said bed, a chip receiving basin, means to drive said outer wall means about said turret, chip sweeping paddle means fixed to said outer wall means and extending across said basin, at least one aperture in said basin and in the path of said chip sweeping paddle means to receive chips swept by said paddle means.

2. A chip sweeper according to claim 1 wherein said paddle means are supported at one end by said outer wall means and extend inwardly therefrom toward said turret and said inner wall means.

3. A chip sweeper according to claim 1 wherein said paddle means are angularly related to diameters of said turret.

4. A chip sweeper in accordance with claim 3 wherein said paddle means are pitched in a direction opposite the direction of movement of said outer wall means.

5. A chip sweeper according to claim 1 wherein said means to drive said wall means comprises a chain fixed to the outer wall means, a drive sprocket for driving said chain, and idler sprocket means for holding said chain in driving engagement with said drive sprocket.

6. A chip sweeper for a machining tool having a turret mounted for rotation about a vertical axis, comprising a bed, inner wall means, a cylindrical conveyor ring movably mounted on said bed and surrounding said inner wall means and said turret to define, with said inner wall means and said bed, a chip receiving basin, a chain fixed to the upper periphery of said conveyor ring, a drive sprocket engaging said chain to drive the conveyor ring about the turret, idler sprockets engaging said chain and holding the chain in driving engagement with the drive sprocket, a plurality of chip sweeping paddles fixed at one end to said conveyor ring and extending inwardly across said basin toward said turret, at least one aperture in said basin and in the path of the chip sweeping paddles to receive chips swept along said basin by said paddles.

References Cited

UNITED STATES PATENTS 2,146,061    2/1939    Fasmer _____ 198—212

RICHARD E. AEGERTER, Primary Examiner

U.S. Cl. X.R.

198—171